(12) United States Patent
Hoover (10) Patent No.: US 11,152,877 B2
(45) Date of Patent: Oct. 19, 2021

(54) METHODS AND SYSTEM FOR DETERMINING AN ERROR AND CORRECTING THE ANGULAR POSITION OF A CONTINUOUS ROTATION MOTOR

(71) Applicant: The Swatch Group Research and Development Ltd, Marin (CH)

(72) Inventor: David Hoover, Peseux (CH)

(73) Assignee: The Swatch Group Research and Development Ltd, Marin (CH)

( * ) Notice: Subject to any disclaimer, the term of this patent is extended or adjusted under 35 U.S.C. 154(b) by 51 days.

(21) Appl. No.: 16/803,360

(22) Filed: Feb. 27, 2020

(65) Prior Publication Data
US 2020/0328702 A1    Oct. 15, 2020

(30) Foreign Application Priority Data

Apr. 12, 2019   (EP) ..................................... 19168876

(51) Int. Cl.
| | | |
|---|---|---|
| *H02P 23/00* | (2016.01) | |
| *H02P 25/00* | (2006.01) | |
| *H02P 27/00* | (2006.01) | |
| *H02P 6/182* | (2016.01) | |
| *H02P 6/26* | (2016.01) | |
| *H02P 21/18* | (2016.01) | |

(52) U.S. Cl.
CPC .............. *H02P 6/182* (2013.01); *H02P 6/26* (2016.02); *H02P 21/18* (2016.02); *H02P 2203/05* (2013.01)

(58) Field of Classification Search
CPC .................. H02P 6/182; H02P 6/26

USPC ........................................................ 318/798
See application file for complete search history.

(56) References Cited

U.S. PATENT DOCUMENTS

| | | | |
|---|---|---|---|
| 6,069,467 A | 5/2000 | Jansen | |
| 2009/0016172 A1* | 1/2009 | Fujii | G04C 3/14 368/80 |
| 2012/0057438 A1* | 3/2012 | Shimizu | G04C 10/02 368/204 |

(Continued)

FOREIGN PATENT DOCUMENTS

| | | |
|---|---|---|
| WO | 2013/132249 A1 | 9/2013 |
| WO | 2018/024963 A1 | 2/2018 |

OTHER PUBLICATIONS

European Search Report for EP 19 16 8876 dated Sep. 25, 2019.

*Primary Examiner* — Erick D Glass
(74) *Attorney, Agent, or Firm* — Sughrue Mion, PLLC (57) ABSTRACT

A method for determining an error in the angular position measurement of a timepiece motor having one or more phases, including: detecting (3) each instant (14) when the value of one of the back electromotive forces is zero, storing (4) a time corresponding to each detected instant, measuring (5) several time intervals between two instants (14) detected in the same revolution of the motor, comparing (6) the measured time intervals to reference time intervals to deduce the reference intervals to which they correspond, and determining (7) an angular position measurement error if the measured intervals do not correspond to the expected reference intervals. The invention also relates to a method for correcting the angular position measurement. Also, a determination and correction system for implementing the methods and a timepiece including such a system.

16 Claims, 3 Drawing Sheets

(56) References Cited

U.S. PATENT DOCUMENTS

2012/0204640 A1* 8/2012 Takyo ................ H02P 8/02
                                                                73/504.04

* cited by examiner

| 82 | 63 | 68 | 88 | 76 | 61 | 80 | 75 | 80 | 75 | 65 | 75 | 90 | 53 | 69 | 91 | 55 | 69 |
| 79 | 64 | 67 | 86 | 81 | 59 | 83 | 72 | 78 | 74 | 66 | 74 | 90 | 51 | 70 | 91 | 56 | 70 |
| 80 | 67 | 66 | 88 | 78 | 61 | 81 | 71 | 77 | 77 | 67 | 79 | 87 | 52 | 69 | 94 | 58 | 72 |
| 82 | 64 | 68 | 88 | 77 | 61 | 83 | 72 | 79 | 75 | 66 | 77 | 89 | 54 | 67 | 93 | 57 | 71 |

METHODS AND SYSTEM FOR DETERMINING AN ERROR AND CORRECTING THE ANGULAR POSITION OF A CONTINUOUS ROTATION MOTOR

CROSS-REFERENCE TO RELATED APPLICATION

This application claims priority to European Patent Application No. 19168876.1, filed on Apr. 12, 2019, the entire contents of which are incorporated herein by reference.

FIELD OF THE INVENTION

The invention concerns a method for determining an error in the measurement of the angular position of a continuous rotation motor having one or more phases, in particular a timepiece motor.

The invention also concerns a method for correcting the measurement of the angular position of a continuous rotation motor having one or more phases.

The invention also concerns a system for determining an error and correcting the measurement of the angular position of a continuous rotation motor having one or more phases, for implementation of the methods.

The invention also concerns a timepiece comprising such a system for determining an error and correcting the measurement of the angular position of a continuous rotation motor having one or more phases.

BACKGROUND OF THE INVENTION

In the field of electric motors, in particular for timepieces, motors comprise a stator provided with coils and a rotor provided with magnets. Electric current is supplied by an electric source in the coils to generate a magnetic field which activates the rotation of the rotor by acting on the magnets. Such motors are, for example, used in timepieces to activate the mechanism driving the hands indicating the time on a dial, for example of a watch. Generally, motors with sequential rotation, called 'stepping motors', are used to control the movement of the hands, particularly the seconds hand, which moves in jerks.

However, it is also possible to envisage using continuous rotation motors, i.e. motors that rotate without stopping. These motors are continuously activated, preferably at constant speed, for example so that a seconds hand moves on the dial without jerking.

There exist, in particular, continuous rotation motors with one or more phases, the number of phases being defined by the number of magnets and coils and by the geometric arrangement thereof on the stator and the rotor. For each phase, the electric source produces a current with a corresponding phase to activate the motor. The induction of the coils produces a back electromotive force correlated with each phase.

It is known to measure the back electromotive forces in order to deduce the angular position of the motor at each instant. In particular, the rotational speed of the motor is measured by detecting sign changes in the back electromotive forces of each phase, and by integrating the speed to deduce the angular position. To determine the angular position of a motor, the number of detected instants is counted, in the knowledge that there is a defined number of instants detected per revolution of the motor. Thus, the exact cumulative angular position can be deduced, even after a large number of revolutions, each of 360°. However, when the motor experiences a malfunction, which causes a slowdown or temporary stoppage of the motor, or which even temporarily causes it rotate backwards in the opposite direction, the voltage becomes too low, so that it is no longer possible to detect the value of the back electromotive force and to deduce therefrom the angular position of the motor. Such a malfunction can occur, for example, following an abrupt wrist or arm movement in the case of a wristwatch. When the motor resumes its rotation, the count is distorted and consequently the deduced angular position is no longer correct.

SUMMARY OF THE INVENTION

It is therefore an object of the invention to overcome the drawbacks of the aforementioned state of the art by proposing a method for determining an error in the measurement of the angular position of a continuous rotation motor having one or more phases, wherein the motor comprises a rotor capable of rotation, during which method it is possible to determine the angular position of the motor following a malfunction, such as a slowdown, stoppage, or change in the direction of rotation of the motor.

To this end, the invention concerns a method for determining an error in the measurement of the angular position of a continuous rotation motor having one or more phases, in particular a timepiece motor.

The method is characterized in that it includes the following steps, consisting in:
detecting each instant when the value of one of the back electromotive forces is zero,
storing a time corresponding to each detected instant,
measuring several time intervals between two instants detected in the same revolution of the motor,
comparing the measured time intervals to reference time intervals to deduce the reference intervals to which they correspond, and
determining an angular position measurement error if the measured intervals do not correspond to the expected reference intervals.

Thus, by measuring several time intervals between detected instants and comparing them to reference time intervals specific to the motor, it is possible to determine whether there is a measurement error, and thus to know the angular position of the motor. Indeed, although the manufacture of a motor is very precise, a motor cannot be designed absolutely perfectly. The shape of the magnets and coils and the arrangement thereof on the rotor and stator vary slightly with the motors. These small imperfections in the motor have an impact on the measurement of the back electromotive forces of the different phases of the motor. Consequently, the back electromotive forces, which each have a sinusoidal shape out of phase with respect to the other phases, may also have a phase difference due to these imperfections.

These phase differences lead to a lack of regularity in the time intervals between successive zero crossings of the back electromotive forces. Thus, it is possible to characterize the various time intervals and determine the angular positions to which the detected instants correspond.

In the event of malfunction of a watch motor, which causes an error in the measurement of the angle value, the method makes it possible to determine this error and find the real angular position of the motor.

As a result of this method, it is sufficient to detect each instant when the value of one of the back electromotive forces is zero in order to determine an error in the angular position of the motor. Consequently, this is a method which is reliable and technically simple to implement and does not require a significant amount of energy.

According to a particular embodiment of the invention, the angular position measurement error is determined by counting the number of instants of advance or lag between the measured intervals and the expected reference intervals.

According to a particular embodiment of the invention, the time intervals are measured between two successive detected instants.

According to a particular embodiment of the invention, the same time interval is measured over several revolutions of the motor to obtain a mean value.

According to a particular embodiment of the invention, time intervals are measured between all the detected instants in one revolution of the motor, to obtain a series of time intervals.

According to a particular embodiment of the invention, the series of time intervals is compared to a series of reference time intervals of one reference revolution of the motor to determine the measurement error.

According to a particular embodiment of the invention, the measurement error is determined by counting the number of instants of advance or lag in the series of time intervals compared to the series of reference time intervals.

According to a particular embodiment of the invention, the method includes a series of preliminary steps of defining the reference intervals, wherein the motor rotates at constant speed and the series of steps consists in:
  detecting each instant when the value of a back electromotive force is zero for a reference revolution of the motor,
  storing a time corresponding to each detected instant,
  measuring time intervals between the successive detected instants for one revolution of the motor,
  storing the measured time intervals as reference intervals for a reference revolution of the motor.

According to a particular embodiment of the invention, the instants are detected over several revolutions of the motor in order to calculate a mean value for each reference time interval of the reference revolution.

According to a particular embodiment of the invention, the series of preliminary steps is regularly repeated to update the reference intervals.

The invention also concerns the use of the determination method described above in a method for correcting the measurement of the angular position of a continuous rotation motor having one or more phases, wherein the motor comprises a rotating rotor and the method comprises the following steps:
  detecting each instant when the value of a back electromotive force is zero,
  counting the number of detected instants to deduce an angular position of the motor,
  carrying out a series of preliminary steps to define reference intervals as described above,
  detecting an anomaly,
  determining an error in the angular position measurement of the motor with the method described above, and
  correcting the angular position measurement of the motor.

According to a particular embodiment of the invention, the motor is stopped as soon as an anomaly is detected, it is then restarted before an angular position measurement error is determined. The anomaly may be a malfunction, or unexpected stoppage of the motor. The anomaly may also be a stoppage and then deliberate restarting of the motor, which is controlled by a specific action; this stoppage being capable of causing a counting error.

According to a particular embodiment of the invention, an anomaly is detected when no more instants are detected, or when a detected instant does not come from a phase corresponding to an expected order.

The invention also concerns a system for determining an error and correcting the measurement of the angular position of a continuous rotation motor having one or more phases, the motor comprising a rotor capable of rotation, for implementation of the methods described above.

To this end, the system includes:
  a unit for monitoring the back electromotive forces of the phases of the motor, the monitoring unit being configured to detect each phase when the value of the back electromotive forces is zero,
  a processing unit configured to store a time corresponding to each detected instant, to measure several time intervals between two instants detected in the same revolution of the motor, to perform a series of preliminary steps to define reference intervals, to compare the measured time intervals to reference time intervals in a reference revolution of the motor in order to deduce to which reference interval they correspond, and to determine an angular position measurement error if the measured intervals do not correspond to the expected reference intervals.

According to a particular embodiment of the invention, the system comprises a unit for correcting the angular position measurement, the correction unit being configured to count the number of detected instants, to deduce an angular position of the motor, to detect an anomaly, and to correct the angular position measurement of the motor.

The invention also concerns a timepiece, the timepiece comprising a continuous rotation motor having one or more phases, the motor comprising a rotor capable of rotation to supply mechanical energy to a timepiece movement, in particular a mechanical movement of a display device with hands, the timepiece comprising such a system for determining an error and correcting the angular position measurement of the motor.

BRIEF DESCRIPTION OF THE DRAWINGS

The objects, advantages and features of the determination and correction methods and system according to the invention will appear more clearly in the following description of at least one non-limiting embodiment illustrated by the drawings, in which.

DETAILED DESCRIPTION OF THE INVENTION

The determination method is arranged to determine an error in the angular position measurement of a continuous motor having one or more phases. It is, for example, a motor for a timepiece, such as a wristwatch. The invention may, however, be extended to any continuous rotation motor. 'Continuous rotation' means that the motor rotates without stopping in its normal operating mode, generally at constant rotational speed, as opposed to a 'stepping motor' which makes small successive rotations interspersed with a stop in rotation.

Such a motor generally includes a stator provided with several coils, for example three coils, regularly distributed over the stator, and a rotor provided with several magnets, for example six magnets, uniformly angularly distributed over the rotor. The rotor is configured to rotate on or inside the stator by means of an electric source, for example a generator, which supplies the current necessary for each of the motor phases. The angular position of the motor is defined in the Application as the position of the rotor with respect to the stator.

The motor according to the invention operates with one or more phases, the number of phases being defined by the number of rotor magnets and stator coils and the geometric arrangement thereof.

Figure 1:
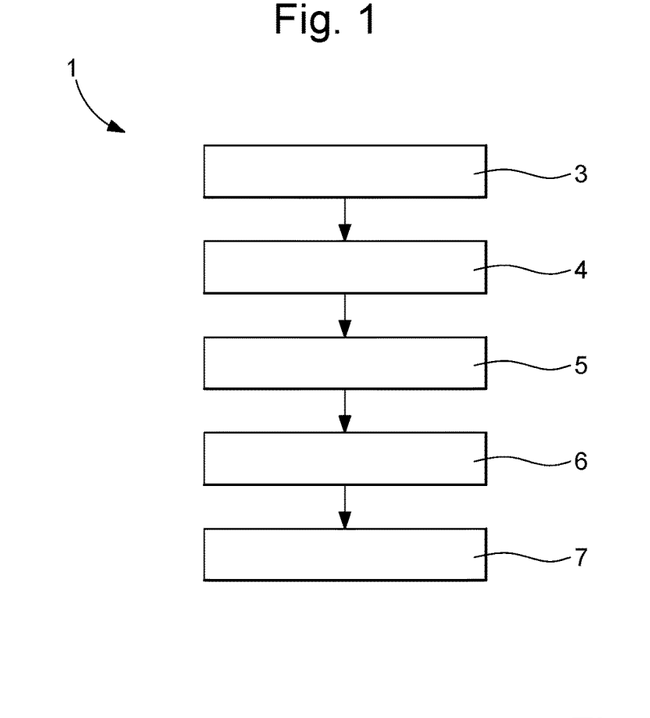
FIG. 1 is a synoptic diagram of a method for determining an error in the angular position measurement of a motor having one or more phases.

Determination method 1, represented in FIG. 1, comprises a first detection step 3, wherein every instant when the value of the back electromotive forces is zero is detected in each phase. As soon as the value a back electromotive force crosses zero, this instant is detected. Thus, the back electromotive forces of the motor phases are monitored, for example by connecting a measurement component to each stator coil. Each phase has one back electromotive force, whose value describes a periodic sinusoidal curve having regular zero crossings. This step 3 is performed regardless of the phase and the detected instants may be of the same phase or of different phases. To this end, the change in sign of the back electromotive forces is preferably detected to determine the moment when the phase crosses zero. Thus, as soon as a change in sign of a value is measured, it is deduced that the value of the back electromotive force has crossed zero.

In a second storage step 4, a time corresponding to each detected instant is stored. To achieve this, the current time is measured during operation of the motor. As soon as one of the phases crosses zero, the value of the current time corresponding to the detected instant is stored. Thus, a series of times is stored for a succession of detections.

The next step, which is the third, is a step 5 of measuring several time intervals between two instants detected in the same revolution of the motor. Successive detected instants are preferably selected, whether they are of the same phase or of different phases. In normal operation of a motor with two or more phases, two successive instants are from two different phases, since the motor phases have the same period and are out of phase with respect to one another, so that one instant of each of the phases is detected sequentially. 'Several' means a number at least equal to two intervals and preferably greater than two or three.

In a preferred embodiment, the time intervals are measured between all the instants detected in one revolution of the motor. Thus, with a large number of intervals, the reliability of the error determination increases. Even more advantageously, each time interval is measured over several revolutions of the motor to obtain a mean value.

Next, the measured time intervals are compared to reference time intervals in a fourth comparison step 6 to deduce the reference intervals to which they correspond. The reference time intervals are characteristics of each motor for instants in one reference revolution of the motor. In other words, each motor has a series of specific time intervals, which is a kind of signature of the motor. The way in which the reference time intervals are defined is described hereafter in the following description. A measured time interval is necessarily very close or identical to a reference time interval, so that it is possible to deduce to which reference time interval it corresponds.

In the preferred embodiment wherein all the intervals are measured, the reliability of the method is increased by comparing a series of successive intervals to a series of successive reference intervals. Indeed, if reference intervals have close values, it is safer to compare a series of intervals to observe the continuity of the angular positions of the motor.

Finally, in a fifth step 7, an angular position measurement error is determined if the measured interval does not correspond to an expected reference interval. In order to know the angular position of the motor, the detected instants are generally counted, in the knowledge that the number of detected instants is constant for one revolution of the motor. The value of the angle can be deduced as a function of the number of instants detected for one 360° revolution of the motor and the measured reference intervals. Thus, the value of an angle $A_i$ for a detected instant i is $A_i = 360 \cdot i/N$, wherein N is the number of detected instants in one revolution. The angular position of the motor is deduced as a function of the number of detected instants.

In normal operation, we know to which reference interval the detected instants correspond. The detected instants follow the order of the reference intervals, so that it is possible to detect to which reference interval each detected instant corresponds. However, following an anomaly, counting may be distorted if instants are no longer detected, yet the motor has continued to rotate in one direction or another. Consequently, the following detected instants define intervals, which are out of phase with respect to the expected reference intervals. Thus, the measured intervals no longer correspond to the expected reference intervals, but to reference intervals ahead of or behind the expected reference intervals. In other words, the expected reference interval does not correspond to the real angular position of the motor. There is consequently an error in the counting of instants inducing this angular position measurement error. To determine this error, the number of instants of advance or lag between the measured intervals and the expected reference intervals is counted. Thus, as a result of this measurement, the angular position measurement can be corrected subsequently.

In the preferred embodiment, the series of time intervals is compared to a series of reference time intervals in one reference revolution of the motor to determine the measurement error. The measurement error is determined by counting the number of instants of advance or lag in the series of measured time intervals compared to the series of reference time intervals in the expected order. To do so, an inter-correlation is performed between the series of measured time intervals and the series of expected reference time intervals. To measure the phase difference between the two series of intervals, the index corresponding to the maximum of the inter-correlation between the two functions representing the two series is calculated. An example of error determination is described in FIG. 6.

Figure 2:
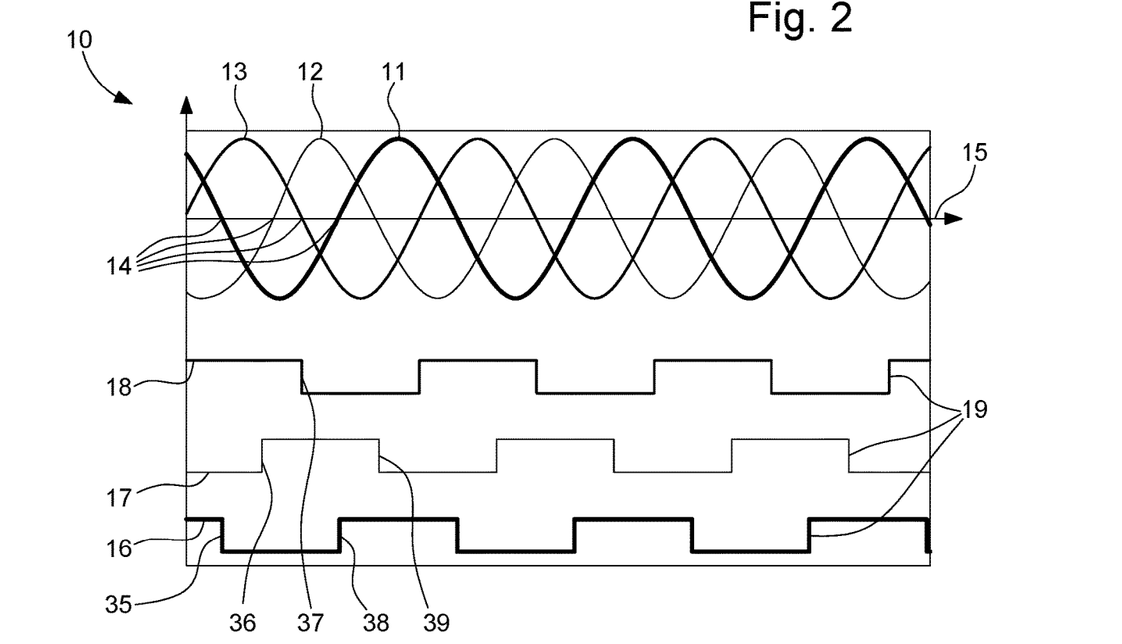
FIG. 2 is a graph representing the phase curves of a three-phase motor.

FIG. 2 represents examples of the sinusoidal curves of back electromotive forces of a three-phase motor. There are three curves 11, 12, 13 of the same period, offset by the same phase shift in pairs, the three curves 11, 12, 13 being superposed on the same graph, each curve corresponding to one phase. It is noted that the curves successively cross the value zero 15 in a determined order. The curves are represented for one revolution of the motor, i.e. for one 360° revolution of the rotor. Consequently, it is clear that eighteen instants 14 are detected for one revolution of the motor.

Below the sinusoidal curves, three rectangular waves are represented one above the other, each rectangular wave representing the sign changes of one of the back electromotive forces. The first rectangular wave 16 corresponds to the first sinusoidal curve 11 of one of the three phases, the second rectangular wave 17 corresponds to second sinusoidal curve 12, the third rectangular wave 18 corresponds to the third sinusoidal curve 13.

A detected instant 19 corresponds to the moment when the value of the rectangular wave changes, i.e. that of the step between a low and high value or high and low value of the rectangle. For example, a first instant 35 is detected on the first rectangular wave 16, a second instant 36 on the second rectangular wave 17, a third instant 37 on the third rectangular wave 18, a fourth instant 38 on the first rectangular wave 16, a fifth instant 39 on the second rectangular wave 17, and so on. The time intervals are measured between two successive instants 35, 36, 37, 38, 39, which belong here to two different rectangular waves. For example, a first interval is measured between the first instant 35 and second instant 36, a second interval is measured between second instant 36 and third instant 37, a third interval is measured between third instant 37 and fourth instant 38, and so on. These intervals can then be compared to the reference intervals to determine the measurement error.

Figure 3:
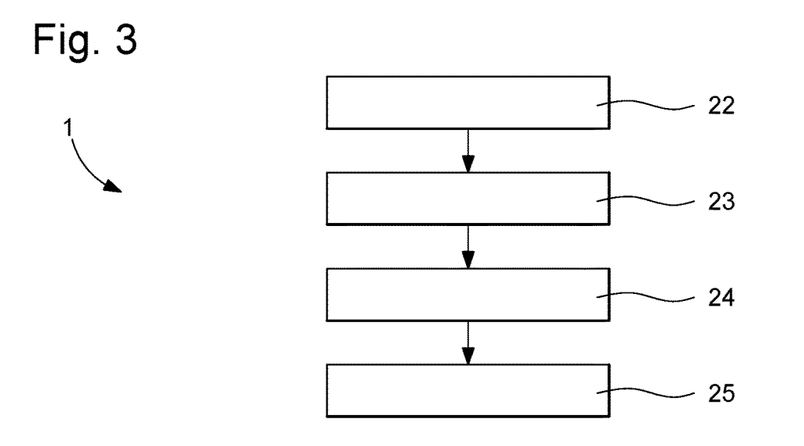
FIG. 3 is a synoptic diagram of the series of preliminary steps of defining reference intervals.

To define the reference intervals, the determination method includes a series of preliminary steps 20, represented in FIG. 3. The steps followed are the same as those of the determination method, but preferably executed in favourable conditions, in which there is no risk of the motor experiencing an anomaly, when the motor rotates at constant speed, for example before an anomaly occurs. The intervals can also be updated during the life of the timepiece, for example by the timepiece owner starting the determination of intervals, or by a programme that automatically starts redefining the intervals. Thus, the series of preliminary steps is preferably repeated regularly to define the reference intervals corresponding to the revolutions of the motor. Indeed, a motor may slightly change in its operation during use. It is therefore necessary to recalculate the reference intervals to adapt them to this change and to enhance the reliability of the angular position determination method.

In a preferred embodiment, the reference intervals are defined during operation of the motor, when the motor is rotating at rest, i.e. while the stator is stationary. Indeed, if the motor is shaken during the definition process, the reference interval values will be distorted. At rest, it is ensured that the motor is rotating at constant speed, without undergoing undesired accelerations. To this end, the motor can be provided with an accelerometer to check that the stator is stationary. In a variant, it is possible to compare the stored values, for example for each column of the FIG. 4 table, to check that the statistical variance of each column is minimal over time. It is therefore deduced that the motor is operating at rest. When an anomaly is detected, the reference intervals are the last stored reference intervals.

As represented in FIG. 3, in a first step 22, each instant when the value of a back electromotive force is zero is detected, and a time corresponding to each detected instant 23 is then stored, and the time intervals between the successive detected instants 24 of one revolution of the motor are measured and stored as reference intervals 25 for a reference revolution.

To improve the reliability of measurement of the reference intervals, the instants are detected over several revolutions of the motor to obtain several values for the same interval. A mean value is then calculated for each reference time interval of the reference revolution of the motor. The FIG. 4 table lists values of intervals measured for several revolutions of the motor, here four revolutions. In this example, the motor has eighteen detectable instants per revolution, thus eighteen intervals to be measured. In other words, the back electromotive forces cross zero eighteen times in total for one revolution of the motor. Each column of the table corresponds to an interval between two successive instants in one revolution of the motor. The values, measured in milliseconds, of the same column are close to one another, since they correspond to the same interval for different revolutions of the motor.

Figure 4:
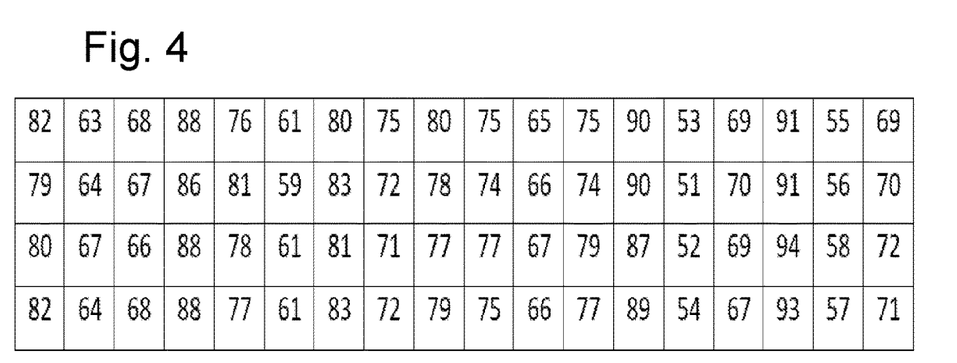
FIG. 4 is a table representing the values of the time intervals measured between the successive detected instants in one revolution of the motor.

After several revolutions, a mean value is calculated for each column, which defines the reference interval value. For example, the first interval has a mean value of 80.75 ms, the second interval 64.5 ms, the third 67.25 ms, the fourth 87.5 ms, the fifth is 78 ms, and the sixth 60.5 ms etc. . . . . . It is noted that the differences can be quite significant between different intervals, for example 17 ms between the fourth and sixth mean value. These differences make it possible to determine to which reference intervals the measured intervals correspond. In the determination method, in order to define the correspondence between the reference intervals of the reference revolution and the measured intervals, they are compared to find the one closest in time. In other words, the numerical value of the measured intervals is compared to the reference intervals to determine to which they correspond.

Figure 6:
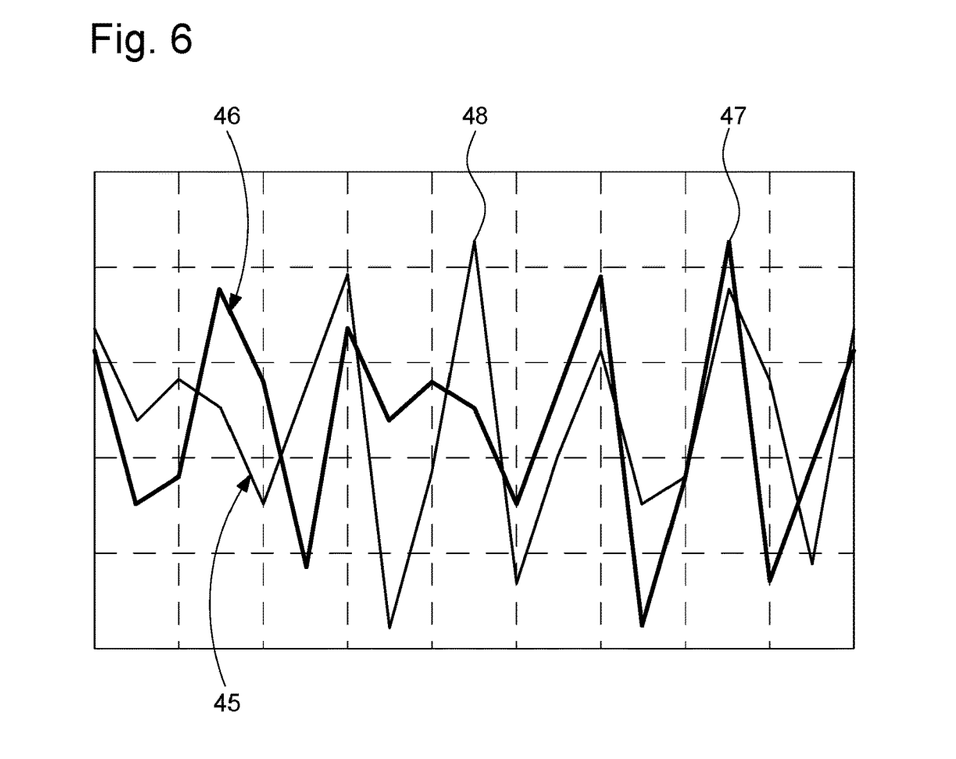
FIG. 6 is a graph representing the intervals measured following a malfunction compared to reference intervals of a continuous rotation motor with three phases.

FIG. 6 shows an example of the phase difference between a series of measured intervals and a series of reference intervals over one revolution of the motor, following an anomaly. FIG. 6 is a graph showing a function 45 representing the measured intervals during one revolution of the motor and a function 46 representing the expected reference intervals. In this example of a three-phase motor, eighteen instants are detected when a phase crosses zero during one revolution of the motor. There are thus eighteen consecutive reference intervals as a function of the angle of rotation for one revolution of the motor. It is observed that the two functions 45, 46 are similar and that the lag or advance of the motor can be deduced with respect to the angular reference position. Taking the value 47 for a reference interval, it is noted that the same value 48 is obtained with six instants of lag on function 45 of the measured intervals. According to the method, an angular position measurement error of six instants has been determined and must therefore be corrected by the value of an angle corresponding to this difference in order to ascertain the exact real angular position of the motor. To calculate this phase difference, for example, an inter-correlation is performed between the series of measured time intervals and the series of expected reference time intervals. To measure the phase difference between the two series of intervals, the index corresponding to the maximum of the inter-correlation between the two functions 45, 46 representing the two series is calculated.

Figure 5:
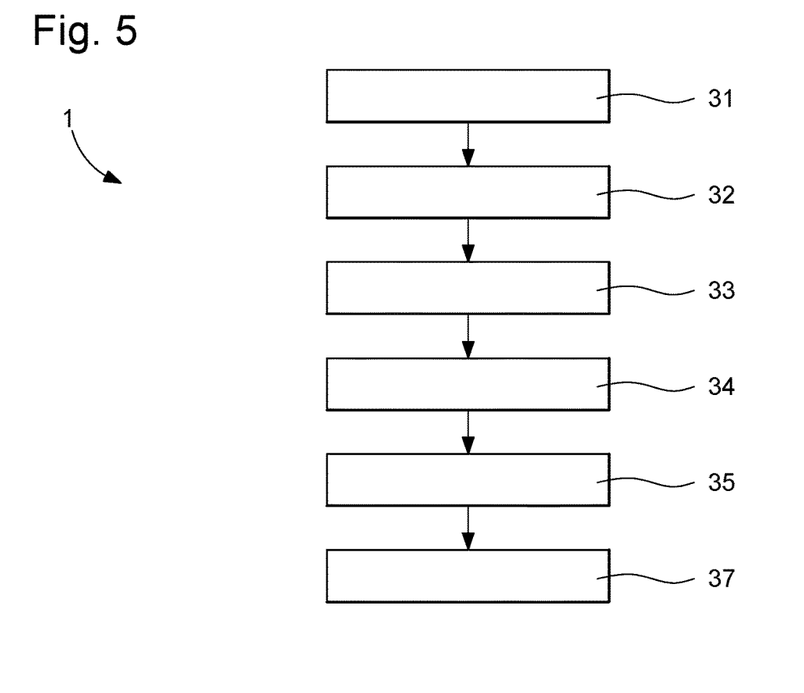
FIG. 5 is a synoptic diagram of a method for correcting the angular position measurement of a motor having one or more phases.

The invention also relates to a method 30 for correcting the angular position measurement of a continuous rotation motor having one or more phases, in particular a timepiece motor. Once the motor is rotating, the method includes several steps below.

A first step consists in detecting 31 each instant 14 when the value of one of the back electromotive forces of the motor phases is zero, by connecting, for example, a measuring component to each stator coil.

In a second simultaneous step, the number of detected instants is counted 32 to deduce an angular position of the motor. The angular position of the motor is an angle given by the number of revolutions of the motor starting from a predefined initial position. The initial position is, for example, the position of the motor when it is started. Thus, by counting the instants, the number of revolutions that the motor has made is deduced in the knowledge that one revolution of the motor corresponds to a defined number of instants. For example, if there are 18 zero crossings of the back electromotive forces per revolution, it can be deduced that the motor has made 10 revolutions, i.e. 3600 degrees, once 180 instants have been detected. This step is important, for example, for an application in a timepiece, since it is possible to deduce the exact position of the hands driven by the motor by knowing the angular position of the motor from its initial position.

Third step 33 consists in performing a series of preliminary steps of defining reference intervals according to the determination method described before.

In a fourth step, it is detected 33 whether an anomaly occurs during the counting operation. An anomaly is, for example, detected when no more instants are detected after a determined time, or when a detected instant does not come from a phase corresponding to an expected order. Generally, an instant is detected on one phase after the other in a specific order as was seen in the example of FIG. 2. Consequently, in the event that two successive instants do not follow this order for a motor with two or more phases, it is deduced that an anomaly has occurred. For example, if the motor changes rotational direction following a shock, the detected instant will be detected on a different phase from that expected.

The motor is stopped as soon as an anomaly is detected 33 and then restarted. Stopping the motor as quickly as possible prevents the anomaly from worsening and the error on the overall angle measurement from increasing with a difference in angle which could exceed one half-revolution of advance or lag. In fact, if the difference in angle exceeds a half-revolution of the motor, it is no longer possible to know whether the measured angle is in advance or lagging with respect to the real angle. Then, the motor is restarted in order to determine its angular position.

An anomaly can also be defined as corresponding to a deliberate stopping and restarting of the motor. For example, when there is a change from a time display to a chronometer display on a watch. The stoppage generally leads to an angular position measurement error after restarting. Indeed, instants cannot be detected when the motor is in the process of stopping and then restarting.

Then, in a fourth step, an error in the angular position measurement of the motor is determined 35 with the determination method described above.

Then, the fifth step consists in correcting 37 the angular position measurement of the motor, using the error measurement of the fourth step. In fact, it is sufficient to add or subtract the angle corresponding to the number of instants of lag or advance, to or from the angular position deduced in the second step. The exact actual position of the motor is thus known.

In a horological application, the exact angular position of the motor from when it started will therefore be precisely known, and thus also the position of the hands and the time displayed, even in the event of an anomaly in the motor. Further, if the time displayed does not correspond to a predefined value, it can be rectified by acting on the motor. Rectification then consists in accelerating or slowing down the motor so that the time displayed corresponds to the predefined time. The predefined value is calculated as a function of the expected position of a mechanical movement, particularly a mechanical watch movement, the movement being driven by said motor. The predefined value is, for example, calculated by a module comprising a quartz oscillator which determines the time that must be displayed. The module makes it possible to define the expected position of the mechanical movement and thus the angular position of the motor which drives the mechanical movement at each instant.

The invention also relates to a method for determining an error and correcting 40 the angular position of a continuous rotation motor having one or more phases, in particular a timepiece motor. System 40 is configured, in particular, to implement the determination and correction methods described above. Represented in FIG. 7, system 40 comprises a unit 41 for monitoring the back electromotive forces of the motor phases. Monitoring unit 41 is connected to the coils of a stator 42 of the motor, to monitor the back electromotive forces of each coil. Monitoring unit 41 is, in particular, configured to detect each instant when the value of the back electromotive forces is zero. According to the determination method, as soon as one of the back electromotive forces crosses zero, monitoring unit 41 transmits a detection signal. Preferably, monitoring unit 41 detects changes in sign of the back electromotive forces to determine whether they have crossed zero.

Figure 7:
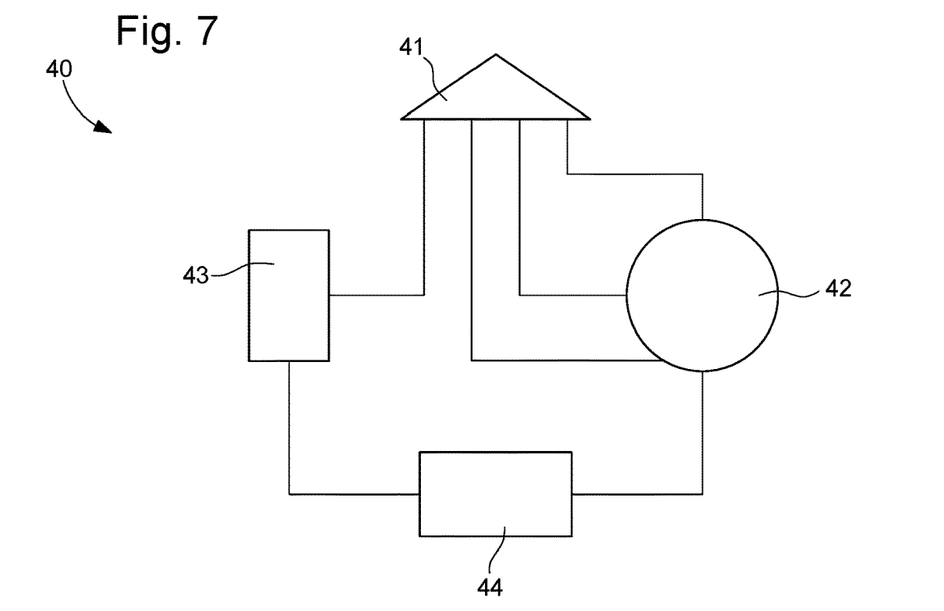
FIG. 7 is a schematic representation of an error determination and angular position measurement correction system according to the invention.

System 40 also includes a processing unit 43 configured to store a time corresponding to each instant detected by monitoring unit 41, the detection signal being received by processing unit 43. Processing unit 43 then measures several time intervals between two instants detected in the same revolution of the motor, preferably between all the instants detected in the revolution. Processing unit 43 compares the measured time intervals to reference time intervals determined according to the determination method. Finally, unit 43 deduces the reference intervals to which they correspond in order to determine an angular position measurement error if the measured intervals do not correspond to the expected reference intervals. Processing unit 43 is also configured to perform the series of preliminary steps of defining reference intervals according to the method described above.

The system also includes a unit 44 for correcting the angular position measurement of the motor, correction unit 44 being connected to the motor and to processing unit 43. Correction unit 44 is configured to count the number of detected instants to deduce an angular position of the motor. As explained in the method, by counting the number of detected instants, the angular position is deduced from an initial position.

According to the method, correction unit 44 is also configured to detect an anomaly, and to stop and then restart the motor if an anomaly is detected. Finally, correction unit 44 corrects the angular position measurement of the motor according to the correction method. To this end, processing unit 43 transmits the determined angular position measurement error to correction unit 44. Thus, if there is an error, correction unit 44 corrects the angular position measurement of the motor.

The invention also relates to a timepiece, not represented in the Figures, the timepiece comprising a case inside which is arranged a continuous rotation motor having one or more phases. The motor is configured to supply mechanical energy to a movement of the timepiece, in particular a mechanical movement of a display device with hands. The timepiece further includes a system for determining an error and correcting the angular position measurement of the motor as described above.

The invention claimed is:

1. A method for determining (1) an error in the measurement of the angular position of a continuous rotation timepiece motor having one or more phases (11, 12, 13), the motor comprising a rotating rotor (42), characterized in that the method (1) comprises the following steps:
   detecting (3) each instant (14) when the value of one of the back electromotive forces is zero,
   storing (4) a time corresponding to each detected instant,
   measuring (5) several time intervals between two instants (14) detected in the same revolution of the motor,
   comparing (6) the measured time intervals to reference time intervals to deduce the reference intervals to which they correspond, and
   determining (7) an angular position measurement error if the measured intervals do not correspond to the expected reference intervals.

2. The method (1) according to claim 1, characterized in that the angular position measurement error is determined (7) by counting the number of instants (14) of advance or lag between the measured intervals and the expected reference intervals.

3. The method (1) according to claim 1, characterized in that the time intervals are measured between two successive detected instants (14).

4. The method (1) according to claim 1, characterized in that the same time interval is measured over several revolutions of the motor to obtain a mean value.

5. The method (1) according to claim 1, characterized in that time intervals are measured (5) between all the instants (14) detected in one revolution of the motor, to obtain a series of time intervals.

6. The method (1) according to claim 5, characterized in that the series of time intervals is compared (6) to a series of reference time intervals of one reference revolution of the motor to determine the measurement error.

7. The method (1) according to claim 6, characterized in that the measurement error is determined (7) by counting the number of instants (14) of advance or lag of the series of time intervals compared to the series of reference time intervals.

8. The method (1) according to claim 1, characterized in that the method includes a series of preliminary steps of defining the reference intervals, wherein the motor rotates at constant speed and the series of steps consists in:
   detecting (22) each instant (14) when the value of a back electromotive force is zero,
   storing (23) a time corresponding to each detected instant (14),
   measuring (24) time intervals between the successive detected instants (14) for one revolution of the motor, and
   storing (25) the measured time intervals as reference intervals for a reference revolution of the motor.

9. The method (1) according to claim 8, characterized in that the instants (14) are detected (22) over several revolutions of the motor in order to determine a mean value for each reference time interval of the reference revolution.

10. The method according to claim 8, characterized in that the series of preliminary steps (22, 23, 24, 25) is regularly repeated to update the reference intervals.

11. A method (30) for correcting the measurement of the angular position of a continuous rotation timepiece motor having one or more phases (11, 12, 13), the motor comprising a rotating rotor (42), characterized in that the method includes the following steps:
    detecting (31) each instant (14) when the value of a back electromotive force is zero,
    counting (32) the number of detected instants (14) to deduce an angular position of the motor,
    performing (33) the series of preliminary steps as defined in claim 8,
    detecting (34) an anomaly,
    determining (35) an error in the angular position measurement of the motor,
    correcting (37) the angular position measurement of the motor.

12. The method (30) according to claim 11, characterized in that the motor is stopped as soon as an anomaly is detected (34) and then restarted before determining (35) an angular position measurement error.

13. The method (30) according to claim 11, characterized in that an anomaly is detected (34) when no more instants are detected, or when a detected instant does not come from a phase corresponding to an expected order.

14. A system (40) for determining an error and correcting the angular position measurement of a continuous rotation timepiece motor having one or more phases (11, 12, 13), the motor comprising a rotating rotor (42), characterized in that the system includes:
    a unit (41) for monitoring the back electromotive forces of the phases of the motor, the monitoring unit (41) being configured to detect each phase when the value of the back electromotive forces is zero,
    a processing unit (43) configured to store a time corresponding to each detected instant, to measure several time intervals between two instants detected in the same revolution of the motor, to perform a series of preliminary steps of defining reference intervals, to compare the measured time intervals to reference time intervals in a reference revolution of the motor in order to deduce to which reference interval they correspond, and to determine an angular position measurement error if the measured intervals do not correspond to the expected reference intervals.

15. The system (40) according to claim 14, characterized in that the system comprises a unit for correcting the angular position measurement, the correction unit being configured (44) to count the number of detected instants (14) and deduce an angular position of the motor, to detect an anomaly, and to correct (36) the angular position measurement of the motor.

16. A timepiece comprising a continuous rotation motor having one or more phases (11, 12, 13), the motor comprising a rotor (42) capable of rotation to supply mechanical energy to a timepiece movement of a display device with hands, and a system (40) for determining an error and correcting the angular position measurement of the motor according to claim 14.

* * * * *